(12) United States Patent
Linemann et al.

(10) Patent No.: US 8,197,938 B2
(45) Date of Patent: Jun. 12, 2012

(54) ADHESION PROMOTER INTENDED FOR APPLICATION TO A THERMOPLASTIC ELASTOMER POLYMER SUBSTRATE AND CORRESPONDING PROCESSES FOR SURFACE TREATMENT AND ADHESIVE ASSEMBLY

(75) Inventors: Reinhard Linemann, Sarreguemines (FR); Bruno D'Herbecourt, Bernay (FR)

(73) Assignee: Arkema France (FR)

( * ) Notice: Subject to any disclaimer, the term of this patent is extended or adjusted under 35 U.S.C. 154(b) by 714 days.

(21) Appl. No.: 12/161,732

(22) PCT Filed: Jan. 23, 2007

(86) PCT No.: PCT/FR2007/050680
§ 371 (c)(1),
(2), (4) Date: Jul. 22, 2008

(87) PCT Pub. No.: WO2007/083072
PCT Pub. Date: Jul. 26, 2007

(65) Prior Publication Data
US 2010/0221553 A1    Sep. 2, 2010

Related U.S. Application Data

(60) Provisional application No. 60/784,313, filed on Mar. 21, 2006.

(30) Foreign Application Priority Data

Jan. 23, 2006    (FR) ................................. 06 50220

(51) Int. Cl.
*B32B 27/40* (2006.01)
(52) U.S. Cl. ............... 428/423.3; 428/423.7; 428/424.2; 428/425.1; 428/425.3; 428/473.5; 428/474.7; 428/475.2; 428/476.1
(58) Field of Classification Search ............... 428/423.3, 428/423.7, 424.2, 425.1, 425.3, 473.5, 474.7, 428/475.2, 476.1
See application file for complete search history.

(56) References Cited

U.S. PATENT DOCUMENTS

| | | | | |
|---|---|---|---|---|
| 3,461,103 A * | 8/1969 | Bayer et al. | ..................... | 528/61 |
| 5,348,804 A * | 9/1994 | Vasselin et al. | ............ | 428/423.1 |
| 5,674,827 A * | 10/1997 | Kawashima et al. | ......... | 510/365 |
| 6,287,411 B1 * | 9/2001 | Kelley et al. | .................. | 156/327 |
| 6,455,138 B1 * | 9/2002 | Murano | ........................ | 428/201 |

* cited by examiner

*Primary Examiner* — Thao T. Tran
(74) *Attorney, Agent, or Firm* — RatnerPrestia

(57) ABSTRACT

Use, as adhesion promoter intended for application to the surface of a substrate S1 made of thermoplastic elastomer polymer TPE which comprises a chain formed of an alteration of hard segments and of soft segments, for the purpose of the adhesive assembly of the said substrate S1 with another substrate S2, of at least one solvent of the hard segments and/or of the soft segments of the said thermoplastic elastomer polymer TPE.

6 Claims, 1 Drawing Sheet

Figure 1:
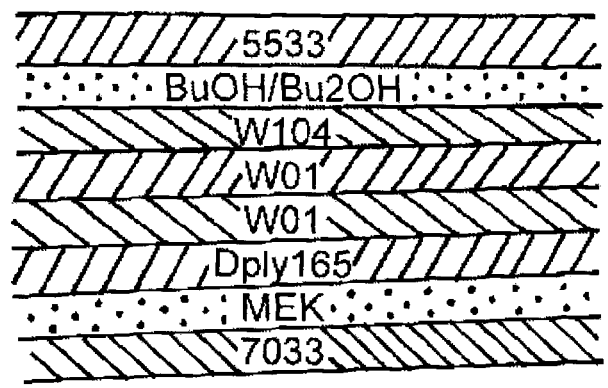

ADHESION PROMOTER INTENDED FOR APPLICATION TO A THERMOPLASTIC ELASTOMER POLYMER SUBSTRATE AND CORRESPONDING PROCESSES FOR SURFACE TREATMENT AND ADHESIVE ASSEMBLY

This application claims benefit, under U.S.C. §119 or §365 of French Application Number FR 06.50220, filed Jan. 23, 2006; U.S. 60/784,313, filed Mar. 21, 2006; and PCT/FR2007/050680 filed Jan. 23, 2007.

FIELD OF THE INVENTION

The present invention relates to the adhesive assembly of a first thermoplastic elastomer polymer substrate S1 and of a second substrate S2 which may be of any nature, for example: polymer, wood, glass, leather, paper, cardboard.

The expression "thermoplastic elastomer polymer, abbreviated to TPE" is intended to mean a block copolymer comprising alternating blocks or segments referred to as hard or rigid and blocks or segments referred to as soft or flexible.

The principal thermoplastic elastomer polymers that may be mentioned are those in which the soft blocks are blocks of polyether (PE) and/or polyester (PES) and the hard blocks are blocks of polyamide (PA), polyurethane (PU) or polyester (PES), it then being possible for the TPEs to be denoted respectively TPE-A, TPE-U and TPE-E.

Although the present invention is in no way limited to TPE-As, the latter represent a particularly preferred category. They can be categorized as polyether ester amides, for which the bonds between the PA blocks and the PE blocks are ester bonds, and polyester amides, for which the bonds between the PA blocks and the PE blocks are amide bonds. By way of examples of TPE-A, mention may be made of those sold under the trademark PEBAX® by the company Arkema.

BACKGROUND OF THE INVENTION

Over the past few years, thermoplastic elastomer polymers, such as polyether ester amide and polyester amide TPE-As, have been widely used in the field of sports shoes, in particular for constituting soles of shoes, for their good mechanical properties, in particular their spring-back property.

In such applications, the soles of sports shoes are made of at least two layers, often one made of TPE-A (in particular of PEBAX®) and the other made of TPE-PU, these two layers being adhesively assembled.

In general, TPE substrates are assembled by adhesion to the other substrates by means of a primer and of adhesives or glues comprising organic solvents, also known as solvent-based primers or solvent-based adhesives, these primers and these adhesives are generally two-component polyurethane adhesives. The two-component adhesives comprise a first component which is an organic resin or a mixture of organic resins comprising functions that can react with the second (crosslinking) component consisting of an isocyanate or of a mixture of isocyanates in solution at least in an organic or pure solvent. By way of examples, the resins constituting the first component may be polyesters, acrylics or epoxy resins comprising hydroxylated, carboxylated, epoxy, amine or amide reactive functions, in solution in an organic solvent, and a second (crosslinking) component which is a solution of isocyanate in an organic or pure solvent.

The conventional assembly process comprises the following successive steps:

Preparation of Substrates S1 and S2:
  Cleaning: the surfaces to be bonded are cleaned, in general, with an organic solvent, in particular methyl ethyl ketone (abbreviated to MEK); the solvent evaporates off during drying, thus involving waste given off into the atmosphere;
  Application of a primer: a solvent-based two-component polyurethane-based primer layer is applied, in general with a brush, to the surface, of the substrates, that is to be bonded; the whole is then placed in an oven in order to dry the primer, this step again involving solvent emissions into the atmosphere;
  Application of an adhesive: a layer of solvent-based or water-based, two-component polyurethane adhesive is applied, in general with a brush, to the substrates prepared; the whole is placed in an oven, generating further emission of solvent into the atmosphere when a solvent-based adhesive is used.

Assembly of Substrates S1 and S2:
  The two substrates S1 and S2 that have thus been adhesive-coated are assembled and undergo a pressing operation in order to ensure their adhesion.

During these various steps, it has been evaluated that approximately 30 kg of organic solvents originating from the use of a solvent-based primer and of a solvent-based adhesive are emitted during the assembly of 10 000 shoes. For this reason, it will be desirable to use primers and/or adhesives that are less polluting in order to limit the solvent emissions while having multilayer structures for which the adhesion between the layers of substrate S1 and S2, defined above, is compatible with use in the field of shoe soles.

DETAILED DESCRIPTION OF THE DRAWINGS

Figure 2:
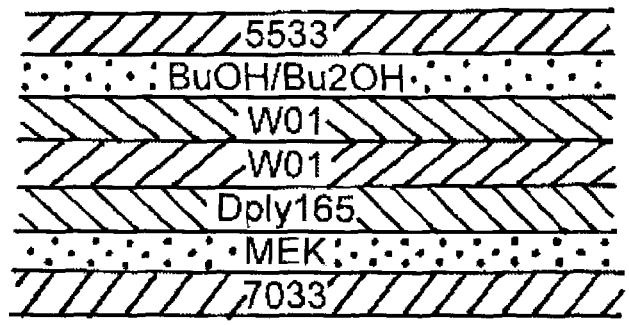
Figure 3:
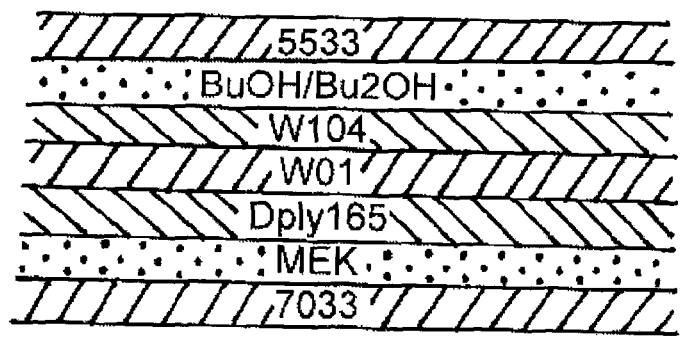

FIGS. 1, 2 and 3 represent schematically the multilayer structure of example 3, example 11 and example 12, respectively.

DETAILED DESCRIPTION OF THE INVENTION

The present invention proposes to address this technical problem. A subject of the present invention is the use of at least one adhesion promoter which is a solvent intended for application to the surface of a substrate S1 during a cleaning/activation step, said substrate S1 being made of a thermoplastic elastomer polymer TPE comprising a chain formed from alternating hard segments and soft segments, for the purpose of the adhesive assembly of said substrate S1 with another substrate S2. A subject of the present invention is also a laminated product or a multilayer structure and a process comprising the application of at least one adhesion promoter which is a solvent or a mixture of solvents to a substrate S1 of TPE type, followed by a step of coating S1 with an aqueous primer and/or an aqueous adhesive of the two-component polyurethane type, and then assembly of the adhesive-coated substrates S1 and S2, making it possible to obtain bonding with an effective adhesive strength. Prior to the adhesive-coated substrate S1 being brought into contact with the substrate S2, an aqueous or solvent primer and/or an aqueous or solvent adhesive will be applied to the surface of S2 intended to be adhesive-coated and intended to be brought into contact with S1, this surface having undergone, before adhesive-coating, cleaning or cleaning/activation depending on the nature of S2.

In the case where S2 is made of TPE, a step of cleaning/activation of the surface of S2 intended to be adhesive-coated is carried out, during which step, as for S1, an adhesion promoter is applied, followed by coating with an aqueous primer and/or an aqueous adhesive of the two-component polyurethane type.

In the case where S2 is not made of TPE, the surface of S2 intended to be adhesive-coated will simply be cleaned with a solvent, the nature of the solvent and also the nature of the primer and/or of the adhesive intended to be applied to said surface of S2 will be chosen in an appropriate manner depending on the nature of the substrate S2.

The adhesion promoter(s) is (are) advantageously chosen from solvents (i) capable of making the chains of TPE flexible and rendering accessible the functions capable of reacting or interacting with at least one adhesive system, which is an aqueous adhesive and/or an aqueous primer, and/or (ii) capable of providing surface swelling of the TPE substrate S1.

The adhesion promoter(s) can be incorporated into an aqueous adhesion primer and/or into an aqueous adhesive and/or into the substrate by bulk incorporation during its transformation.

As regards the adhesion promoter(s), mention may be made of butanediols such as 1,3-butanediol or 1,4-butanediol, metacresol, carvacrol, glycerol, glycols, butanols such as n-butanol or isobutanol, benzyl alcohol, butyl glycol, butyl diglycol and limonene, and mixtures thereof.

The adhesion promoter(s) may be functional solvents capable of reacting or interacting with at least one adhesive system which is preferably an aqueous adhesive comprising free isocyanate functions in the case of the adhesion promoter and the adhesive being brought into contact directly in the laminated product and/or an aqueous primer comprising free isocyanate functions in the case of the adhesion promoter and the primer being brought into contact directly in the laminated product. The functional solvent(s) may be chosen from compounds comprising at least one —OH, —COOH or —NH$_2$ function, borne by a backbone that is in particular aliphatic, cycloaliphatic or aromatic. In particular, functional solvents that may be mentioned include thymol, carvacrol, butanols, butanediols, butyl glycol, butyl diglycol, glycerol, benzyl alcohol and metacresol, and mixtures thereof.

However, if use was made of blocked isocyanate functions which would be deblocked at the time the adhesive system was used, i.e. at the time the adhesive and/or the primer were used, this would not depart from the context of the invention.

The adhesion promoter(s) (i) may be cleaning solvents or functional solvents for the substrates S1 or S1 and S2 when the substrates are of the same nature, or (ii) is (are) combined with at least one cleaning solvent or at least one functional solvent for said substrate(s).

The adhesion promoter(s) may be capable of acting under cold conditions or under hot conditions.

The thermoplastic elastomer copolymers of the substrate S1, or even of the substrate S2, can be chosen from copolymers comprising soft PE blocks and comprising hard blocks chosen from polyamides PA, polyurethanes PU and polyesters, preferably copolymers comprising PEBA blocks, of polyether ester amide and polyether amide type.

By way of example of polyether block copolymers, mention may be made of copolymers comprising polyester blocks and polyether blocks (also called polyether esters), copolymers comprising polyurethane blocks and polyether blocks (also called TPUs, the abbreviation for thermoplastic polyurethanes) and copolymers comprising polyamide blocks and polyether blocks (also called PEBAs according to the IUPAC).

As regards the polyether esters, these are copolymers comprising polyester blocks and polyether blocks. They consist of soft polyether blocks, which are the residues of polyetherdiols, and rigid segments (polyester blocks), which result from the reaction of at least one dicarboxylic acid with at least one chain-extender short diol unit. The polyester blocks and the polyether blocks are linked by ester links resulting from the reaction of the acid functions of the acid with the OH functions of the polyetherdiol. The chain-extender short diol may be chosen from the group consisting of neopentyl glycol, cyclohexanedimethanol and aliphatic glycols of formula HO(CH$_2$)$_n$OH in which n is an integer ranging from 2 to 10.

Advantageously, the diacids are aromatic dicarboxylic acids having from 8 to 14 carbon atoms. Up to 50 mol % of the aromatic dicarboxylic acid may be replaced with at least one other aromatic dicarboxylic acid having from 8 to 14 carbon atoms and/or up to 20 mol % may be replaced with an aliphatic dicarboxylic acid having from 2 to 12 carbon atoms.

By way of example of aromatic dicarboxylic acids, mention may be made of terephthalic acid, isophthalic acid, dibenzoic acid, naphthalene dicarboxylic acid, 4,4"-diphenylenedicarboxylic acid, bis(p-carboxyphenyl)methane acid, ethylenebis(p-benzoic) acid, 1,4-tetramethylenebis(p-oxybenzoic) acid, ethylenebis(para-oxybenzoic) acid and 1,3-trimethylenebis(p-oxybenzoic) acid. By way of example of glycols, mention may be made of ethylene glycol, 1,3-trimethylene glycol, 1,4-trimethylene glycol, 1,6-hexamethylene glycol, 1,4-propylene glycol, 1,8-octamethylene glycol, 1,10-decamethylene glycol and 1,4-cyclohexylene dimethanol. The copolymers comprising polyester blocks and polyether blocks are, for example, copolymers having polyether units derived from polyether diols, such as polyethylene glycol (PEG), polypropylene glycol (PPG) or polytetramethylene glycol (PTMG), dicarboxylic acid units such as terephthalic acid, and glycol (ethanediol) or 1,4-butanediol units. The chainlinking of the polyethers and of the diacids forms the soft segments, whereas the chainlinking of the glycol or of the butanediol with the diacids forms the rigid segments of the copolyether ester. Such copolyether esters are described in patents EP 402 883 and EP 405 227. These polyether esters are thermoplastic elastomers. They may contain plasticizers.

As regards the TPUs, they consist of soft polyether blocks, which are residues of polyetherdiols, and rigid blocks (polyurethanes), which result from the reaction of at least one diisocyanate with at least one short diol. The chain-extender short diol can be chosen from the glycols mentioned above in the description of the polyether esters. The polyurethane blocks and the polyether blocks are linked by links resulting from the reaction of the isocyanate functions with the OH functions of the polyetherdiol.

Mention may also be made of polyester urethanes, for example those comprising diisocyanate units, units derived from amorphous polyester diols and units derived from a chain-extender short diol. They may contain plasticizers.

The copolymers comprising polyamide blocks and polyether blocks (PEBA) result from the copolycondensation of polyamide blocks having reactive end groups with polyether blocks having reactive end groups, such as, among others:

1) polyamide blocks having diamine chain ends with polyoxyalkylene blocks having dicarboxylic chain ends;
2) polyamide blocks having dicarboxylic chain ends with polyoxyalkylene blocks with diamine chain ends obtained by cyanoethylation and hydrogenation of aliphatic alpha, omega-dihydroxylated polyoxyalkylene blocks, called polyetherdiols;

3) polyamide blocks having dicarboxylic chain ends with polyetherdiols, the products obtained being, in this particular case, polyether ester amides. The copolymers of the invention are advantageously of this type.

The polyamide blocks having dicarboxylic chain ends derive, for example, from the condensation of polyamide precursors in the presence of a chain-stopper dicarboxylic acid.

The polyamide blocks having diamine chain ends derive, for example, from the condensation of polyamide precursors in the presence of a chain-stopper diamine.

The PEBAs may also include randomly distributed units. These polymers may be prepared by the simultaneous reaction of the polyether and of the polyamide block precursors.

For example, a polyetherdiol, polyamide precursors and a chain-stopper diacid may be reacted together. A polymer having essentially polyether blocks, polyamide blocks of very variable length, but also the various reactants that have reacted randomly, which are distributed randomly along the polymer chain, are obtained.

A polyether diamine, polyamide precursors and a chain-stopper diacid may also be reacted together. A polymer having essentially polyether blocks, polyamide blocks of very variable length, but also the various reactants that have reacted randomly, which are distributed randomly along the polymer chain, are obtained.

Advantageously, three types of polyamide blocks may be used. According to a first type, the polyamide blocks derive from the condensation of a dicarboxylic acid and a diamine.

According to a second type, the polyamide blocks result from the condensation of one or more alpha, omega-aminocarboxylic acids and/or of one or more lactams having from 6 to 12 carbon atoms in the presence of a dicarboxylic acid having from 4 to 12 carbon atoms or of a diamine.

According to a third type, the polyamide blocks result from the condensation of at least one alpha, omega-aminocarboxylic acid (or a lactam), at least one diamine and at least one dicarboxylic acid. According to a variant of this third type, the polyamide blocks result from the condensation of at least two alpha, omege-aminocarboxylic acids or of at least two lactams having from 6 to 12 carbon atoms or of a lactam and of an aminocarboxylic acid not having the same number of carbon atoms possibly in the presence of a chain stopper.

Advantageously, the polyamide blocks of the second type are polyamide-12 or polyamide-6 blocks.

By way of examples of polyamide blocks of the third type, mention may be made of the following:

PA 6.6/Pip. 10/12 in which:
  6.6 denotes hexamethylene adipamide (hexamethylenediamine condensed with adipic acid) units;
  Pip. 10 denotes units resulting from the condensation of piperazine and of sebacic acid;
  12 denotes units resulting from the condensation of lauryllactam.

The proportions by weight are respectively 25 to 35/20 to 30/20 to 30/the total being 80, and advantageously 30 to 35/22 to 27/22 to 27/the total being 80. For example, the proportions 32/24/24 result in a melting point of 122 to 137° C.

6.6/6.10/11/12 in which:
  6.6 denotes hexamethylenediamine condensed with adipic acid;
  6.10 denotes hexamethylenediamine condensed with sebacic acid;
  11 denotes units resulting from the condensation of aminoundecanoic acid;
  12 denotes units resulting from the condensation of lauryllactam.

The proportions by weight are respectively 10 to 20/15 to 25/10 to 20/15 to 25, the total being 70, and advantageously 12 to 16/18 to 25/12 to 16/18 to 25, the total being 70. For example, the proportions 14/21/14/21 result in a melting point of 119 to 131° C.

The polyamide blocks are obtained in the presence of a chain-stopper diacid or diamine, if it is desired to have polyamide blocks with acid or amine end groups. If the precursors already contain a diacid or a diamine, it is sufficient for example to use it in excess.

By way of example of aliphatic alpha, omega-aminocarboxylic acids, mention may be made of aminocaproic acid, 7-aminoheptanoic acid, 11-aminoundecanoic acid and 12-aminododecanoic acid.

By way of examples of lactams, mention may be made of caprolactam, oenantholactam and lauryllactam.

By way of example of aliphatic diamines, mention may be made of hexamethylenediamine, dodecamethylenediamine and trimethylhexamethylenediamine.

By way of example of cycloaliphatic diacids, mention may be made of 1,4-cyclohexyldicarboxylic acid.

By way of example of aliphatic diacids, mention may be made of butanedioic acid, adipic acid, azelaic acid, suberic acid, sebacic acid and dodecanedicarboxylic acid, dimerized fatty acids (these dimerized fatty acids preferably have a dimer content of at least 98%; they are preferably hydrogenated; they are sold under the brand name "Pripol" by the company "Unichema", or under the brand name Empol by the company Henkel) and $\alpha,\omega$-polyoxyalkylene diacids.

By way of example of aromatic diacids, mention may be made of terephthalic acid (T) and isophthalic acid (I).

The cycloaliphatic diamines may be the isomers of bis(4-aminocyclohexyl)methane (BACM), bis(3-methyl-4-aminocyclohexyl)methane (BMACM), 2,2-bis(3-methyl-4-aminocyclohexyl)propane (BMACP) and para-aminodicyclohexylmethane (PACM). Other diamines commonly used may be isophoronediamine (IPDA), 2,6-bis(aminomethyl)norbornane (BAMN) and piperazine.

The polyether blocks may represent 5% to 85% by weight of the copolymer comprising polyamide and polyether blocks. The polyether blocks consist of alkylene oxide units. These units may, for example, be ethylene oxide units, propylene oxide units or tetrahydrofuran units (which lead to polytetramethylene glycol chain linkages). Thus, PEG blocks, i.e. those consisting of ethylene oxide units, PPG blocks, i.e. those consisting of propylene oxide units, poly (trimethylene ether glycol) units (such copolymers with poly (trimethylene ether) blocks are described in U.S. Pat. No. 6,590,065) and PTMG blocks, i.e. those consisting of tetramethylene glycol units, also called polytetrahydrofuran, are used. Advantageously, PEG blocks or blocks obtained by oxyethylation of bisphenols, such as for example bisphenol A, are used. The latter products are described in patent EP 613 919.

The polyether blocks may also consist of ethoxylated primary amines. It is also advantageous to use these blocks. By way of example of ethoxylated primary amines, mention may be made of the products of formula:

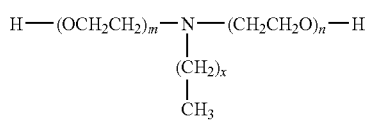

in which m and n are between 1 and 20 and x is between 8 and 18. These products are commercially available under the brand name NORAMOX® from the company CECA and under the brand name GENAMIN® from the company CLARIANT.

The amount of polyether blocks in these copolymers comprising polyamide blocks and polyether blocks is advantageously from 10% to 70% by weight of the copolymer, and preferably from 35% to 60%.

The polyetherdiol blocks are either used as such and copolycondensed with polyamide blocks having carboxylic end groups, or they are aminated in order to be converted into polyether diamines and condensed with polyamide blocks having carboxylic end groups. They may also be blended with polyamide precursors and a diacid chain stopper in order to make polymers comprising polyamide blocks and polyether blocks having randomly distributed units.

The number-average molecular weight Mn of the polyamide blocks is between 500 and 10 000, and preferably between 500 and 4000, except for the polyamide blocks of the second type. The molecular weight Mn of the polyether blocks is between 100 and 6000, and preferably between 200 and 3000.

These polymers comprising polyamide blocks and polyether blocks, whether they derive from the copolycondensation of polyamide blocks and polyethers prepared beforehand, or from a one-step reaction, have, for example, an intrinsic viscosity, measured in metacresol at 25° C. for an initial concentration of 0.8 g/100 ml, of between 0.8 and 2.5.

As regards the preparation of the copolymers comprising polyamide blocks and polyether blocks, they may be prepared by any means allowing the polyamide blocks and the polyether blocks to be linked together. In practice, essentially two processes are used, one called a two-step process and the other a one-step process. In the two-step process, the polyamide blocks are firstly produced and then, in a second step, the polyamide blocks and the polyether blocks are linked together. In the one-step process, the polyamide precursors, the chain stopper and the polyether are mixed together; a polymer having essentially polyether blocks, polyamide blocks of very variable length, but also the various reactants that have reacted randomly, which are distributed randomly along the polymer chain, are obtained. Regardless of whether the process is a one-step or a two-step process, it is advantageous to carry it out in the presence of a catalyst. It is possible to use the catalysts described in U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920, WO 04 037898, EP 1262527, EP 1270211, EP 1136512, EP 1046675, EP 1057870, EP 1155065, EP 506495 and EP 504058. In the one-step process, polyamide blocks are also produced; this is why it was stated at the beginning of this paragraph that these copolymers could be prepared by any means for linking the polyamide blocks and the polyether blocks together.

Usual polymers: those comprising PA blocks made of PA-6, made of PA-12 or made of PA 6/6.6 and those comprising PTMG blocks.

As regards the substrate S2, it may be of the same nature as S1 or of a different nature. Mention may be made of polymers and copolymers, such as polyolefins, polyamines, polyamides (abbreviated to PA), polyesters (abbreviated to PES), polyethers (abbreviated to PE), polyester ethers, polyimides, polyamideimides, polycarbonates, phenolic resins, crosslinked or noncrosslinked polyurethanes (abbreviated to PU), in particular foams, polyimides, poly(ethylene/vinyl acetate)s, natural or synthetic elastomers, such as polybutadienes, polyisoprenes, styrene-butadiene-styrene (SBS), styrene-butadiene-acrylonitrile (SBN), polyacrylonitriles, natural or synthetic fabrics, in particular fabrics made of organic polymer fibers, such as fabrics made of polypropylene, polyethylene, polyester, polyvinyl alcohol, polyvinyl acetate, polyvinyl chloride or polyaramid fibers, fabrics made of glass fibers and carbon fibers, and also materials such as leather, paper, glass, wood and cardboard. All these materials may also be in foam form when this is possible.

In accordance with a particularly advantageous embodiment of the present invention, the substrate S1 is a PEBA (copolymer comprising polyamide blocks and polyether blocks) and the adhesion promoter is butanediol, advantageously as a mixture with butanol.

As regards the adhesive system, i.e. the aqueous adhesion primer and/or the aqueous adhesive, these are two-component polyurethane-type compositions of which:

the first component is a solution or a dispersion or an emulsion of at least one functionalized resin in water, optionally cosolvent-based. These functionalized resins, known to those skilled in the art, comprise, for example, functions of the hydroxyl, carboxyl, amine or amide type. They may be polyester resins, acrylic resins, epoxy resins; and the second component, which is added to the first component, just before use, and which allows crosslinking of said first component, is an isocyanate or a mixture of isocyanates.

The present invention also relates to a process for the surface treatment of a substrate S1 made of TPE in order to promote the attachment of an aqueous primer or of an aqueous adhesive to said substrate S1 for the purpose of the adhesive assembly of said substrate S1 adhesive-coated in this way, with another substrate S2, characterized in that an adhesion promoter is applied to the substrate S1, (i) either prior to the application of said aqueous primer and/or of said aqueous adhesive, as defined above, where appropriate the adhesion promoter being as a mixture with at least one cleaning and/or functional solvent as defined above, (ii) or simultaneously with an aqueous adhesion primer and/or with an aqueous adhesive.

In accordance with specific embodiments of the above process of the present invention:

at least one adhesion promoter is applied to the substrate before application of an adhesion primer;

at least one adhesion promoter is applied to the substrate as a mixture with an adhesion primer, therefore at the same time as the adhesion primer is applied;

at least one adhesion promoter is applied to the substrate as a mixture with the adhesive in the absence of adhesion primer, therefore at the same time as the adhesive is applied;

the adhesion primer and/or the adhesive are applied to the substrate, the adhesion promoter being incorporated into the mass of the substrate.

The last three embodiments above may optionally be carried out without a cleaning/activation step.

Finally, the present invention relates to a kit for the adhesive assembly of a thermoplastic elastomer (TPE) polymer substrate S1 to another substrate S2, said kit comprising:

an adhesion promoter as defined above, optionally a cleaning solvent and/or a functional solvent as defined above,
at least one of an aqueous adhesion primer intended for coating S1 and an aqueous glue or adhesive intended for coating the substrate S1 with adhesive, and
at least one of an aqueous or solvent-based adhesion primer intended for coating the substrate S2 and an aqueous or solvent-based glue or adhesive intended for coating the substrate S2 with adhesive.

EXAMPLES

The following examples illustrate the present invention without, however, limiting the scope thereof. In these examples, the following abbreviations are used:
Substrates
  5533: PEBA of PA12-PTMG type (polyamide-12-polytetramethylene glycol), sold by the company Arkema under the name "PEBAX® 5533".
  7033: PEBA of PA12-PTMG type (polyamide-12-polytetramethylene glycol), sold by the company Arkema under the name "PEBAX® 7033".
  PEBAX® 7033 is harder than PEBAX® 5533.
  TPE-PU: copolymer comprising polyurethane blocks and polyester and/or polyether blocks.
Solvent
  MEK: methyl ethyl ketone
  BuOH: n-butanol
  Bu2OH: 1,3-butanediol
Primers
  W104: water-based primer sold by the company DONG-SUNG under the name "Aquace® W104".
  Dply 165: solvent-based primer sold by the company DONGSUNG under the name "D-Ply® 165".
Adhesive
  W01: aqueous adhesive sold by the company DONG-SUNG under the name "Aquace® W01".
  The tests were carried out using the following material:
  press in A524 (WKD 029 setting maximum pressure (indication 78.4 to 147.1 Pa (8 to 15 kg/cm$^2$));
  Heraeus oven in A524 (FGE 138) setting 70° C., ventilated;
  ISO 34 punch;
  pneumatic press for cutting out test specimens.
General Procedure for Assembly
The substrates S1 and S2 are sheets having dimensions of 100×100×1 mm.
(1) Preparation of the Substrate S1
  cleaning (in the comparative examples), with a solvent, a smooth face of the substrate S1, or cleaning and activating (in the examples according to the invention), with an adhesion promoter, a smooth face of the substrate S1;
  drying for 2 minutes at ambient temperature (unless otherwise indicated);
  applying the aqueous primer W104 with a Meyer bar;
  drying for 5 minutes at 70° C. in a ventilated oven;
  cooling for 2 minutes at ambient temperature;
  applying the aqueous adhesive W01 with a Meyer bar;
  drying for 5 minutes at 70° C. in a ventilated oven.
(2) Preparation of the Substrate S2
  cleaning a smooth face of the substrate S2 with the MEK solvent;
  drying for 2 minutes at ambient temperature;
  applying the Dply 165 solvent-based primer with a brush;
  drying for 3 minutes at 70° C. in a ventilated oven;
  cooling for 2 minutes at ambient temperature;
  applying the aqueous adhesive W01 with a Meyer bar;
  drying for 5 minutes at 70° C. in a ventilated oven.

(3) Assembly of the Substrates S1 and S2
The two substrates, the surfaces of which have been adhesive-coated, are assembled by pressing at 78.4 Pa (8 kg/cm$^2$) for 15 seconds.
General Procedure for Measuring the Strength of Adhesion or Peeling Strength
Test specimens having dimensions of 100×15×1 mm were cut out with a punch.
The test specimens were conditioned in an air-conditioned room (23° C., 50% RH) for 48 hours.
The peeling test, for measuring the peeling strength, was carried out on a Zwick 1445 (WKM 048) in A12, at 180° C., according to the "Peeling, 500N sensor, at 100 mm/min" method, in which the strength is measured as a function of the distance between the jaws of the apparatus (elongation). A regular curve shows a plateau, showing uniform adhesion over the entire test specimen.

Examples or Comparative Examples 1 to 10

The procedure above was applied to various pairs of substrates S1-S2. Table 1 shows the nature of each of these substrates, the type of treatment of the substrate S1 (cleaning or cleaning and activation), and also the results obtained in terms of peeling strength.
The term "activation" is intended to mean the application according to the invention of an adhesion promoter.

TABLE 1

|  | S1 | Cleaning | Cleaning and activation | S2 | Peeling strength N/m (kg/cm) | Remarks |
| --- | --- | --- | --- | --- | --- | --- |
| Comp 1 | 5533 | MEK |  | 7033 | — | test not reproducible irregular adhesion |
| Comp 2 | 5533 | MEK |  | TPE-PU | 4.31 (0.44) | strength measured after pressing of pieces at 750 daN |
| Ex 3 | 5533 |  | 1,3-butanediol/n-butanol (1) | 7033 | 105.42 (10.75) | regular peeling curves |
| Ex 4 | 5533 |  | 1,3-butanediol/n-butanol (1) | TPE-PY | 75.81 (7.73) |  |
| Ex 5 (2) | 5533 |  | 1,3-butanediol/n-butanol (1) | 7033 | 116.67 (11.9) | regular peeling curves |
| Ex 6 (3) | 5533 |  | 1,3-butanediol/n-butanol (1) | 7033 | between 39.23 and 68.64 (4 and 7) | irregular peeling curves |
| Ex 7 | 5533 |  | 1,3-butanediol/isobutanol (1) | 7033 | 116.70 (11.9) | very irregular peeling curves |
| Ex 8 | 7033 |  | carvacrol/thymol (4) | 5533 | 101.01 (10.3) |  |

TABLE 1-continued

| | S1 | Cleaning | Cleaning and activation | S2 | Peeling strength N/m (kg/cm) | Remarks |
|---|---|---|---|---|---|---|
| Ex 9 | 7033 | | carvacrol | 5533 | 90.22 (9.2) | |
| Comp 10 | 7033 | MEK | | 5533 | 0 | |

(1) ratio by volume of 70/30
(2) 1 minute at 70° C. after application of the adhesion promoter
(3) 10 minutes at 70° C. after application of the adhesion promoter
(4) ratio by volume of 33/66

Examples 3 and 4 compared with comparative examples respectively 1 and 2, show the activation of the surface of the substrate S1 when an adhesion promoter is used, making it possible to use an aqueous primer and an aqueous adhesive with a PEBA with excellent adhesion.

Example 5 shows, compared with example 3, that the activation can be further increased by heating the adhesion promoter.

Example 6, although of the invention since good adhesion is obtained, shows that the activation by heating should be adjusted by those skilled in the art in order to obtain optimized activation.

Example 7 shows, compared with example 3, the effect of the choice of the adhesion promoter.

Examples 11 and 12

See FIGS. 1 to 3

Another series of tests was carried out, in which the possibility of reducing the use of primer or of adhesive was studied.

FIGS. 1, 2 and 3 represent schematically the multilayer structure of example 3, example 11 and example 12, respectively.

In example 11, carried out on the model of example 3, during the preparation of the substrate S1, no primer was applied to said activated substrate S1, unlike said example 3. The adhesive W01 is subsequently applied directly to the activated substrate S1. The adhesive-coated substrate S1 is then obtained. The preparation of the substrate S2 has already been described above.

In example 12, carried out on the model of example 3, during the preparation of the substrate S1, the primer W104 was applied to the activated substrate S1, but no adhesive was subsequently applied, unlike said example 3. The adhesive-coated substrate S1 is then obtained. The preparation of the substrate S2 has already been described above.

The substrates thus prepared were assembled with the substrate S2 with the same general assembly procedure described above. The results obtained are very good: peeling strength >48.4 N/cm (8 kg/cm) and regular curves.

The invention claimed is:

1. An adhesive assembly comprising at least two layers of substrate S1 and S2 bonded by means of at least one aqueous adhesive system, at least one of the substrates being a thermoplastic elastomer polymer (TPE) having been activated by an adhesion promoter which is a solvent selected from the group consisting of butanediols, 1,3-butanediol, 1,4-butanediol, metacresol, carvacrol, glycerol, glycols, butyl glycol, butyl diglycol, butanols, n-butanol, isobutanol, benzyl alcohol, limonene, and mixtures thereof, wherein the thermoplastic elastomer polymers of the substrate S1 are chosen from copolymers comprising soft polyester or polyether blocks and comprising hard blocks, wherein said hard blocks are chosen from polyamide (PA), polyurethane (PU) and polyester; wherein S2 is either a thermoplastic elastomer polymer chosen from copolymers comprising soft polyester or polyether blocks and comprising hard blocks, wherein said hard blocks are chosen from polyamide (PA), polyurethane (PU) and polyester—or else S2 is selected from the group of polymers and copolymers consisting of polyolefins, polyamines, polyamides (PA), polyesters (PES), polyethers (PE), polyester ethers, polyimides, polyamideimides, polycarbonates, phenolic resins, crosslinked or noncrosslinked polyurethanes (PU), PU foams, polyimides, poly(ethylene/vinyl acetate)s, natural or synthetic elastomers, polybutadienes, polyisoprenes, styrene-butadiene-styrene (SBS), styrene-butadiene-acrylonitrile (SBN), polyacrylonitriles, natural or synthetic fabrics, fabrics made of organic polymer fibers; fabrics made of polypropylene, polyethylene, polyester, polyvinyl alcohol, polyvinyl acetate, polyvinyl chloride or polyaramid fibers; fabrics made of glass fibers, fibers made of carbon fibers, leather, paper, glass, wood and cardboard.

2. The adhesive assembly of claim 1, wherein said adhesive assembly comprises a shoe sole.

3. The adhesive assembly of claim 1, wherein the adhesion promoter(s) are incorporated into the aqueous adhesion primer, into the aqueous adhesive, and/or into the substrate S1 by bulk incorporation during its transformation.

4. The adhesive assembly of claim 1, wherein the adhesive system is of the two-component polyurethane type.

5. The adhesive assembly of claim 1, wherein the copolymers in substrate S1 comprise polyamide blocks and polyether blocks (PEBA) blocks, of the polyether ester amide type.

6. The adhesive assembly of claim 1, wherein the substrate S1 is a PEBA and the adhesion promoter is butanediol.

* * * * *